US012625905B2

(12) United States Patent
Yoon

(10) Patent No.: US 12,625,905 B2
(45) Date of Patent: May 12, 2026

(54) PERFORMING VIDEO MOMENT RETRIEVAL UTILIZING DEEP LEARNING

(71) Applicant: Adobe Inc., San Jose, CA (US)

(72) Inventor: Seunghyun Yoon, Seoul (KR)

(73) Assignee: Adobe Inc., San Jose, CA (US)

( * ) Notice: Subject to any disclaimer, the term of this patent is extended or adjusted under 35 U.S.C. 154(b) by 286 days.

(21) Appl. No.: 18/354,833

(22) Filed: Jul. 19, 2023

(65) Prior Publication Data

US 2025/0028758 A1    Jan. 23, 2025

(51) Int. Cl.
| | |
|---|---|
| *G06F 16/732* | (2019.01) |
| *G06F 40/35* | (2020.01) |
| *G06V 10/74* | (2022.01) |
| *G06V 10/776* | (2022.01) |
| *G06V 10/82* | (2022.01) |
| *G06V 10/86* | (2022.01) |
| *G06V 20/40* | (2022.01) |
| *G06V 20/62* | (2022.01) |

(52) U.S. Cl.
CPC .......... *G06F 16/732* (2019.01); *G06V 10/761* (2022.01); *G06V 10/776* (2022.01); *G06V 10/82* (2022.01); *G06V 10/86* (2022.01); *G06V 20/48* (2022.01); *G06V 20/62* (2022.01); *G06F 40/35* (2020.01)

(58) Field of Classification Search
CPC ........ G06F 16/732; G06F 40/35; G06F 40/30; G06V 10/761; G06V 10/776; G06V 10/82; G06V 10/86; G06V 20/48; G06V 20/62

See application file for complete search history.

(56) References Cited

U.S. PATENT DOCUMENTS

2022/0107645 A1*    4/2022    Kalantidis ............... G06T 9/002

OTHER PUBLICATIONS

Negative Sample Matters, Wang et al 2021 (Year: 2021).*
Boosting Contrastive, Huynh et al 2022 (Year: 2022).*
Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In Advances in Neural Information Processing Systems 30: Annual Conference on Neural Information Processing Systems 2017, Dec. 4-9, 2017, Long Beach, CA, USA, pp. 5998-6008.

(Continued)

*Primary Examiner* — Jianxun Yang
(74) *Attorney, Agent, or Firm* — Keller Preece PLLC

(57) ABSTRACT

The present disclosure relates to systems, methods, and non-transitory computer-readable media that learns parameters for a natural language video localization model utilizing a curated dataset. In particular, in some embodiments, the disclosed systems generate a set of similarity scores between a target query and a video dataset that includes a plurality of digital videos. For instance, the disclosed systems determines a false-negative threshold by utilizing the set of similarity scores to exclude a subset of false-negative samples from the plurality of digital videos. Further, the disclosed systems determines a negative sample distribution and generates a curated dataset that includes a subset of negative samples with the subset of false-negative samples excluded.

20 Claims, 10 Drawing Sheets

(56)　　　　　References Cited

OTHER PUBLICATIONS

Daizong Liu, Xiaoye Qu, Jianfeng Dong, Pan Zhou, Yu Cheng, Wei Wei, Zichuan Xu, and Yulai Xie. 2021. Context-aware biaffine localizing network for temporal sentence grounding. In Proceedings of the IEEE/CVF Conference on Computer Vision and Pattern Recognition, pp. 11235-11244.

Du Tran, Lubomir D. Bourdev, Rob Fergus, Lorenzo Torresani, and Manohar Paluri. 2015. Learning spatiotemporal features with 3d convolutional networks. In 2015 IEEE International Conference on Computer Vision, ICCV 2015, Santiago, Chile, Dec. 7-13, 2015, pp. 4489-4497. IEEE Computer Society.

Guoshun Nan, Rui Qiao, Yao Xiao, Jun Liu, Sicong Leng, Hao Zhang, and Wei Lu. 2021. Interventional video grounding with dual contrastive learning. In Proceedings of the IEEE/CVF conference on computer vision and pattern recognition, pp. 2765-2775.

Hao Zhang, Aixin Sun, Wei Jing, and Joey Tianyi Zhou. 2020a. Span-based localizing network for natural language video localization. arXiv preprint arXiv:2004.13931.

Jinhyuk Lee, Mujeen Sung, Jaewoo Kang, and Danqi Chen. 2021. Learning dense representations of phrases at scale. In Proceedings of the 59th Annual Meeting of the Association for Computational Linguistics and the 11th International Joint Conference on Natural Language Processing (vol. 1: Long Papers), pp. 6634-6647, Online. Association for Computational Linguistics.

Jiyang Gao, Chen Sun, Zhenheng Yang, and Ram Nevatia. 2017. TALL: temporal activity localization via language query. In IEEE International Conference on Computer Vision, ICCV 2017, Venice, Italy, Oct. 22-29, 2017, pp. 5277-5285. IEEE Computer Society.

Junyu Gao and Changsheng Xu. 2021. Fast video moment retrieval. In Proceedings of the IEEE/CVF International Conference on Computer Vision, pp. 1523-1532.

Karen Simonyan and Andrew Zisserman. 2015. Very deep convolutional networks for large-scale image recognition. In 3rd International Conference on Learning Representations, ICLR 2015, San Diego, CA, USA, May 7-9, 2015, Conference Track Proceedings.

Lisa Anne Hendricks, Oliver Wang, Eli Shechtman, 404 Josef Sivic, Trevor Darrell, and Bryan Russell. 2017. 405 Localizing moments in video with natural language. 406 In Proceedings of the IEEE international conference 407 on computer vision, pp. 5803-5812.

Michaela Regneri, Marcus Rohrbach, Dominikus Wetzel, Stefan Thater, Bernt Schiele, and Manfred Pinkal. 2013. Grounding action descriptions in videos. Transactions of the Association for Computational Linguistics, 1:25-36.

Ranjay Krishna, Kenji Hata, Frederic Ren, Li Fei-Fei, and Juan Carlos Niebles. 2017. Dense-captioning events in videos. In IEEE International Conference on Computer Vision, ICCV 2017, Venice, Italy, Oct. 22-29, 2017, pp. 706-715. IEEE Computer Society.

Songyang Zhang, Houwen Peng, Jianlong Fu, and Jiebo Luo. 2020b. Learning 2d temporal adjacent networks for moment localization with natural language. In The Thirty-Fourth AAAI Conference on Artificial Intelligence, AAAI 2020, The Thirty-Second Innovative Applications of Artificial Intelligence Conference, IAAI 2020, The Tenth AAAI Symposium on Educational Advances in Artificial Intelligence, EAAI 2020, New York, NY, USA, Feb. 7-12, 2020, pp. 12870-12877. AAAI Press.

Yung-Sung Chuang, Rumen Dangovski, Hongyin Luo, Yang Zhang, Shiyu Chang, Marin Soljacic, Shang-Wen Li, Scott Yih, Yoon Kim, and James Glass. 2022. DiffCSE: Difference-based contrastive learning for sentence embeddings. In Proceedings of the 2022 Conference of the North American Chapter of the Association for Computational Linguistics: Human Language Technologies, pp. 4207-4218, Seattle United States. Association for Computational Linguistics.

Zhenzhi Wang, Limin Wang, Tao Wu, Tianhao Li, and Gangshan Wu. 2022. Negative sample matters: A renaissance of metric learning for temporal grounding. In Proceedings of the AAAI Conference on Artificial Intelligence, vol. 36, pp. 2613-2623.

* cited by examiner

Computing Device _700_

Media Management System _104_

Video Dataset Localization System _102_

Similarity Score Generator _702_

False-Negative Threshold Manager _704_

Negative Sample Distribution Manager _706_

Curated Dataset Generator _708_

Natural Language Video Localization Model _710_

Text Embedding Model _711_

Data Storage _712_

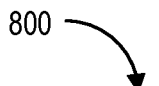

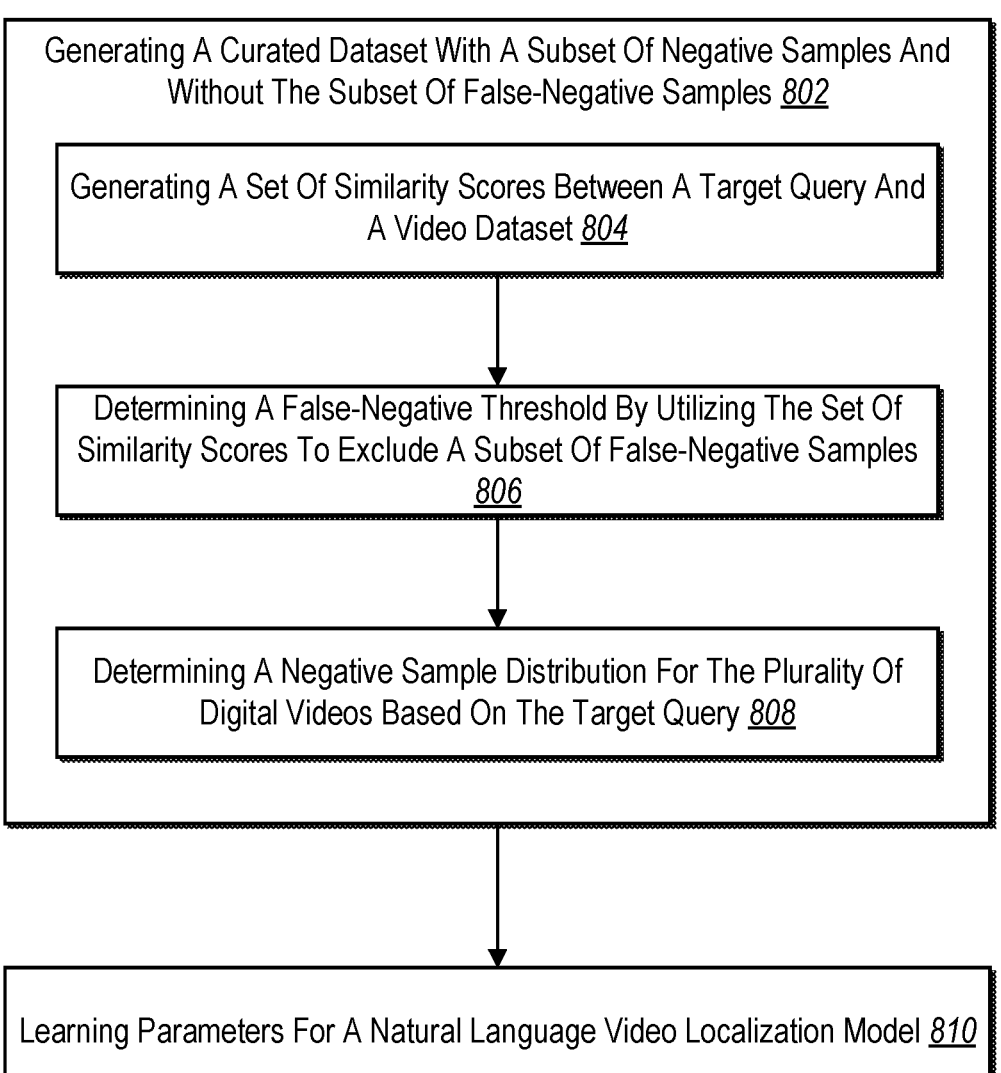

Generating A Curated Dataset With A Subset Of Negative Samples And Without The Subset Of False-Negative Samples _802_

Generating A Set Of Similarity Scores Between A Target Query And A Video Dataset _804_

Determining A False-Negative Threshold By Utilizing The Set Of Similarity Scores To Exclude A Subset Of False-Negative Samples _806_

Determining A Negative Sample Distribution For The Plurality Of Digital Videos Based On The Target Query _808_

Learning Parameters For A Natural Language Video Localization Model _810_

*Fig. 8*

900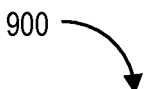

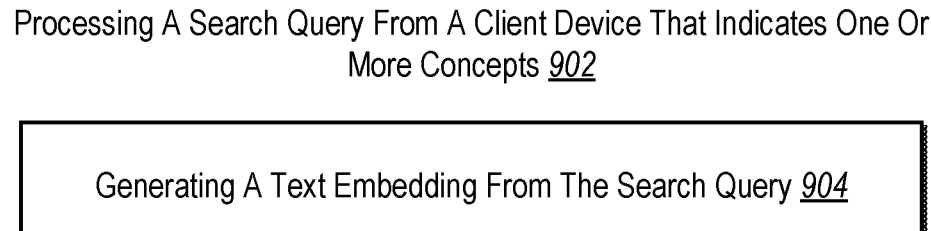

Processing A Search Query From A Client Device That Indicates One Or More Concepts *902*

Generating A Text Embedding From The Search Query *904*

Determining A Set Of Digital Video Embeddings *906*

Comparing The Text Embedding From The Search Query With The Set Of Digital Video Embeddings *908*

Providing One Or More Indications Of Video Content From One Or More Videos Responsive To The Search Query *910*

*Fig. 9*

PERFORMING VIDEO MOMENT RETRIEVAL UTILIZING DEEP LEARNING

BACKGROUND

Recent years have seen significant advancement in hardware and software platforms for video sharing. For example, many video sharing platforms are more accessible due to advancements in networking and storage technology. As such, video sharing platforms receive new content daily, resulting in massive libraries of digital videos. However, despite these advancements, existing video sharing platforms continue to suffer from a variety of problems with regard to computational accuracy of locating specific videos and operational flexibility of implementing video sharing platforms on computing devices.

SUMMARY

One or more embodiments described herein provide benefits and/or solve one or more of the problems in the art with systems, methods, and non-transitory computer-readable media that implements a natural language video localization model to detect video moments within a database of digital videos that match a given natural language query. For example, in one or more embodiments, the disclosed systems provide detected video moment(s) (e.g., one or more indications of video content or timestamps from videos) that corresponds with a search query. In particular, in one or more implementations the disclosed systems localize video frames from a massive set of videos given a text query (e.g., a search query relating to the massive set of videos).

Furthermore, in some embodiments the disclosed systems construct a dataset (e.g., curates a dataset of digital videos) to train the natural language video localization model. Moreover, as part of constructing the dataset, the disclosed systems generate a set of similarity scores between a target query and a video dataset. Further, based on the generated set of similarity scores, the disclosed systems exclude a subset of false-negative samples from the dataset. Accordingly, the disclosed systems generate a curated dataset that includes a specific subset of negative samples with the subset of false-negative samples excluded. In one or more embodiments, the disclosed systems learn parameters for the natural language video localization model based on the curated dataset.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 8 illustrates a flowchart of a series of acts for learning parameters for a natural language video localization model in accordance with one or more embodiments;

FIG. 9 illustrates a flowchart of a series of acts for providing one or more indications of video content to a client device in accordance with one or more embodiments;

DETAILED DESCRIPTION

Figure 1:
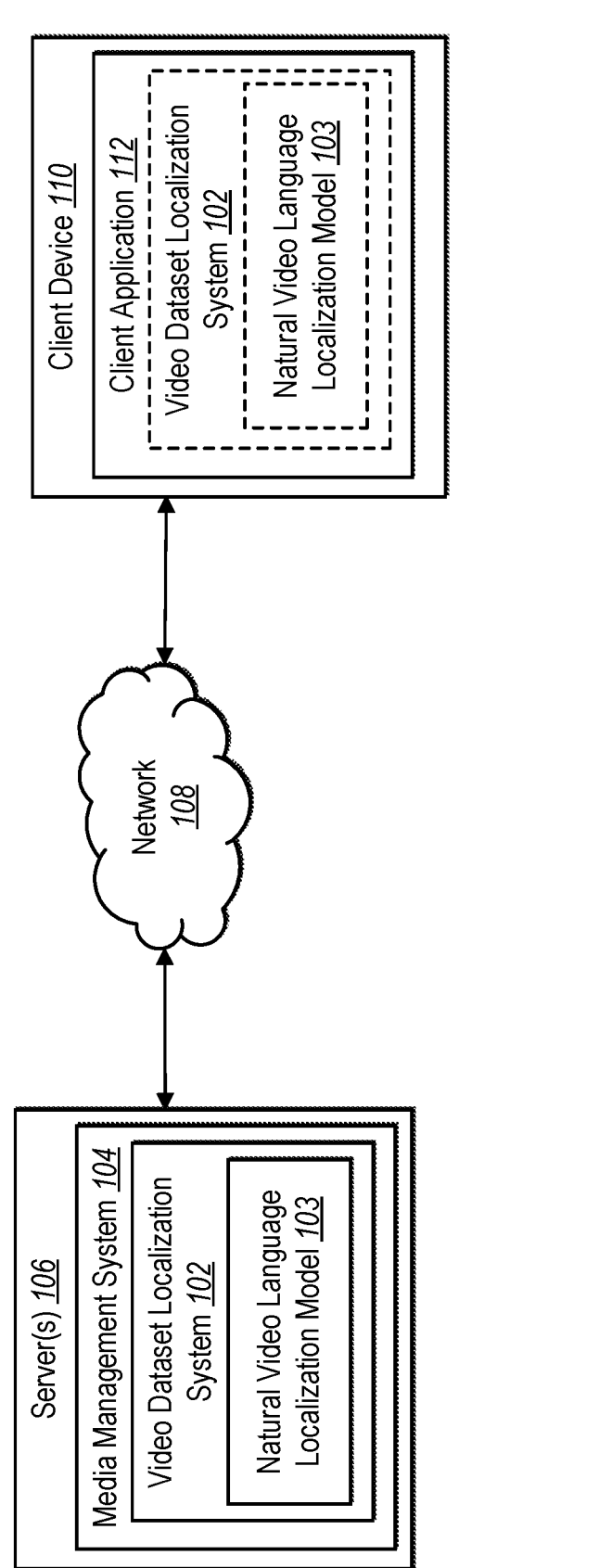
FIG. 1 illustrates an example environment in which a video dataset localization system operates in accordance with one or more embodiments.

One or more embodiments described herein include a video dataset localization system that implements a natural language video localization model to provide one or more indications of video content from one or more videos of a video dataset in response to a search query. In particular, in one or more implementations the video dataset localization system expands search coverage to a massive video set to locate a moment within one or more videos that corresponds with a search query. Moreover, in one or more embodiments the video dataset localization system constructs a massive video moment retrieval dataset (e.g., curates a video dataset) for learning parameters of the natural language video localization model. In particular, this approach of utilizing a curated dataset for learning parameters enhances the accuracy and operational flexibility of the natural language video localization model. For instance, the video dataset localization system more accurately and flexibly provides one or more indications of video content that corresponds with a search query to a client device. Specifically, the video dataset localization system curates the video dataset by removing a subset of false-negative samples and including within the dataset positive samples and a subset of negative samples.

In one or more embodiments, the video dataset localization system constructs the dataset (e.g., the curated dataset) by utilizing other publicly available video datasets. In particular, in some embodiments, the video dataset localization system utilizes public natural language video localization datasets and curates digital videos from them. For instance, the video dataset localization system generates one or more curated datasets from the public natural language video localization datasets and utilizes the curated dataset(s) to further learn parameters of a natural language video localization model.

Further, in one or more embodiments, the process of generating the curated dataset includes determining similarity scores. In particular, in one or more embodiments, the video dataset localization system generates a set of similarity scores between a target query and digital videos within a video dataset (e.g., one of the public natural language video localization datasets). For instance, the video dataset localization system utilizes a text embedding model to generate a text embedding of the target query and a set of digital video embeddings for the digital videos within the video dataset. Moreover, the video dataset localization system determines a similarity between each digital video embedding and the text embedding of the target query.

In one or more embodiments, the video dataset localization system excludes digital videos from a video dataset. In particular, in one or more embodiments, the video dataset localization system excludes digital videos with a similarity score that satisfy a threshold for false-negative samples (e.g., similar relative to the text embedding of the target query). For instance, the video dataset localization system establishes a false-negative sample threshold based on a sampling distribution of the set of similarity scores.

In some embodiments, the video dataset localization system determines a sampling distribution of the digital videos remaining in the video dataset after excluding the false-negative samples. In particular, in one or more embodiments, the video dataset localization system defines a sampling distribution based on a mean distribution value and a standard deviation value to determine which digital videos of the video dataset are considered negative samples. Moreover, based on the sampling distribution (e.g., a negative sample distribution), the video dataset localization system identifies a subset of negative samples to include within the curated dataset.

As just mentioned above, in one or more embodiments, the video dataset localization system generates the curated dataset with the subset of negative samples and without the subset of false-negative samples. For example, the video dataset localization system utilizes the curated dataset to learn parameters of a natural language video localization model. In particular, in learning parameters, the video dataset localization system retrieves optimal moments from positive samples of a video dataset that semantically matches with a search query (e.g., a target query), where the video dataset contains both the negative samples mentioned above (e.g., the subset of negative samples) and positive samples.

As mentioned above, many conventional systems suffer from a number of issues in relation to computational inaccuracy and operational inflexibility. For example, some existing video searching models inaccurately locate videos within video sharing platforms. In particular, for searching for moments within a dataset of digital videos, conventional video searching models are easily distracted by false-positive video frames. As such, conventional video searching models (inaccurately) locate moments within a dataset of digital videos that do not correspond with a search query. Accordingly, in some instances, conventional video sharing models inaccurately provide video moments in response to a search query within a dataset of digital videos.

Further, conventional video searching models typically only search within a single video. For instance, conventional video searching models process a search query and attempt to locate a moment that corresponds with the search query within a single video. Accordingly, due to conventional video searching models only searching within a single video, conventional video searching models typically fail to locate relevant moments accurately and exhaustively within a dataset of digital videos. In other words, conventional video searching systems often fail to scale up to more than a single video search.

Relatedly, certain conventional video searching models suffer from operational inflexibility. Indeed, for reasons similar to those described in relation to the inaccuracies of some prior systems, many prior systems are also rigidly limited to searching for a moment corresponding with a search query within a single video. In particular, because some conventional video searching models are tuned to search within a single video, in implementing conventional searching models for tasks that involve many digital videos, conventional video searching models fail to adapt. Thus, many of the inaccuracy concerns discussed above exacerbates the operational flexibility of conventional video searching models.

As suggested, one or more embodiments of the video dataset localization system provides several advantages over conventional video searching models. For example, in one or more embodiments, the video dataset localization system improves accuracy over prior systems. For example, as mentioned, conventional video searching models suffer from inaccuracy in searching for video moments within a dataset of digital videos due to conventional video searching models being distracted by false-positive video frames. In one or more embodiments, the video dataset localization system overcomes inaccuracy issues of conventional video searching models by generating a curated dataset that includes a subset of negative samples based on a negative sample distribution without a subset of false-negative samples (e.g., excluded based on a false-negative threshold). In particular, in some embodiments the video dataset localization system generates the curated dataset and learns parameters for a natural language video localization model based on the curated dataset. For instance, by learning parameters based on the curated dataset, the video dataset localization system overcomes issues of being distracted by false-positive video frames due to the curated dataset containing a selective subset of negative samples and the subset of false-negative samples excluded. Accordingly, in some embodiments, the video dataset localization system learns parameters from the curated dataset to accurately search for video moment(s) within a dataset of digital videos.

As mentioned, conventional video searching models further suffer from inaccuracy when searching for video moment(s) corresponding with a search query amongst a dataset of many digital videos. For example, the video dataset localization system overcomes the inaccuracy issues of conventional video searching models by utilizing a pre-trained natural language video localization model, pre-trained on a curated dataset. In particular, in some embodiments the pre-trained natural language video localization model is pre-trained on the curated dataset, where the curated dataset includes a subset of negative samples (e.g., identified from a negative sample distribution), positive samples, and a subset of false-negative samples excluded. In some embodiments, by utilizing the pre-trained natural language video localization model, the video dataset localization system accurately locates moment(s) corresponding with a search query within a dataset of many digital videos. In other words, the video dataset localization system accurately scales up for searching video moments in a single video to searching amongst multiple videos due to learning parameters of the natural language video localization model based on the curated dataset.

In addition to accuracy improvements, in one or more embodiments, the video dataset localization system improves operational flexibility over prior systems. For reasons similar to those described in relation to the accuracy improvements, in one or more embodiments, the video dataset localization system flexibly adapts to searching amongst multiple videos and not being distracted by the presence of false-positive samples. Thus, in contrast to some prior systems that are rigidly fixed to locating video moments within a single video (e.g., providing identified video moments to a client device), in one or more embodiments, the video dataset localization system has a diverse capability to consider many digital videos within a video dataset corresponding to a search query to accurately identify video moment(s). Specifically, the video dataset localization system has more operational flexibility in performing video searching tasks due to learning parameters of the natural language video localization model based on the curated dataset.

Additional detail regarding the video dataset localization system will now be provided with reference to the figures. For example, FIG. 1 illustrates a schematic diagram of an exemplary system environment 100 in which the video dataset localization system 102 operates. As illustrated in FIG. 1, the system environment 100 includes a server(s) 106, a media management system 104, a natural language video localization model 103, a network 108, a client device 110, and a client application 112.

Although the system environment 100 of FIG. 1 is depicted as having a particular number of components, the system environment 100 is capable of having a different number of additional or alternative components (e.g., a different number of servers, client devices, or other components in communication with the video dataset localization system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 10). Moreover, the server(s) 106 and the client device 110 include one or more of a variety of computing devices (including one or more computing devices as discussed in greater detail in relation to FIG. 10).

As mentioned above, the system environment 100 includes the server(s) 106. In one or more embodiments, the server(s) 106 processes a search query from a user of the client application 112 to detect video moments within a video dataset that corresponds with the search query. In one or more embodiments, the server(s) 106 comprises a data server. In some implementations, the server(s) 106 comprises a communication server or a web-hosting server.

In one or more embodiments, the client device 110 includes a computing device that is able to generate and/or provide, for display, one or more video moments from a dataset of digital videos corresponding with a search query on the client application 112. For example, the client device 110 includes smartphones, tablets, desktop computers, laptop computers, head-mounted-display devices, or other electronic devices. The client device 110 includes one or more applications for processing search queries in accordance with the media management system 104. For example, in one or more embodiments, the client application 112 works in tandem with the video dataset localization system to process search queries and/or to generate a curated dataset to learn parameters of a natural language video localization model. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the video dataset localization system 102 on the server(s) 106 supports the video dataset localization system 102 on the client device 110. For instance, in some cases, the media management system 104 on the server(s) 106 gathers data for the video dataset localization system 102. In response, the video dataset localization system 102 on the server(s) 106 learns parameters for the natural language video localization model 103 based on a curated dataset. In one or more embodiments, the client device 110 obtains (e.g., downloads) the video dataset localization system 102 and the trained natural language video localization model 103 from the server(s) 106. Once downloaded, the video dataset localization system 102 on the client device 110 provides one or more video moment(s) based on a search query.

In alternative implementations, the video dataset localization system includes a web hosting application that allows the client device 110 to interact with content and services hosted on the server(s) 106. To illustrate, in one or more implementations, the client device 110 accesses a software application supported by the server(s) 106. The video dataset localization system 102 on the server(s) 106, trains the natural language video localization model 103 based on a curated dataset and identifies/provides video moments corresponding with a search query at inference time. The server(s) 106 provides the identified video moments to the client device 110 for display.

To illustrate, in some cases, the video dataset localization system 102 on the client device 110 receives a search query at inference time or a target query at training time. The client device 110 transmits the search query or the target query to the server(s) 106. In response, the video dataset localization system 102 on the server(s) 106 learns parameters of the natural language video localization model 103 or detects one or more video moments corresponding with the query.

Indeed, in some embodiments, the video dataset localization system 102 is implemented in whole, or in part, by the individual elements of the system environment 100. For instance, although FIG. 1 illustrates the video dataset localization system 102 implemented or hosted on the server(s) 106, different components of the video dataset localization system 102 are able to be implemented by a variety of devices within the system environment 100. For example, one or more (or all) components of the video dataset localization system 102 are implemented by a different computing device (e.g., the client device 110) or a separate server from the server(s) 106. Indeed, as shown in FIG. 1, the client device 110 includes the video dataset localization system 102. Example components of the video dataset localization system 102 will be described below with regard to FIG. 7.

Figure 2:
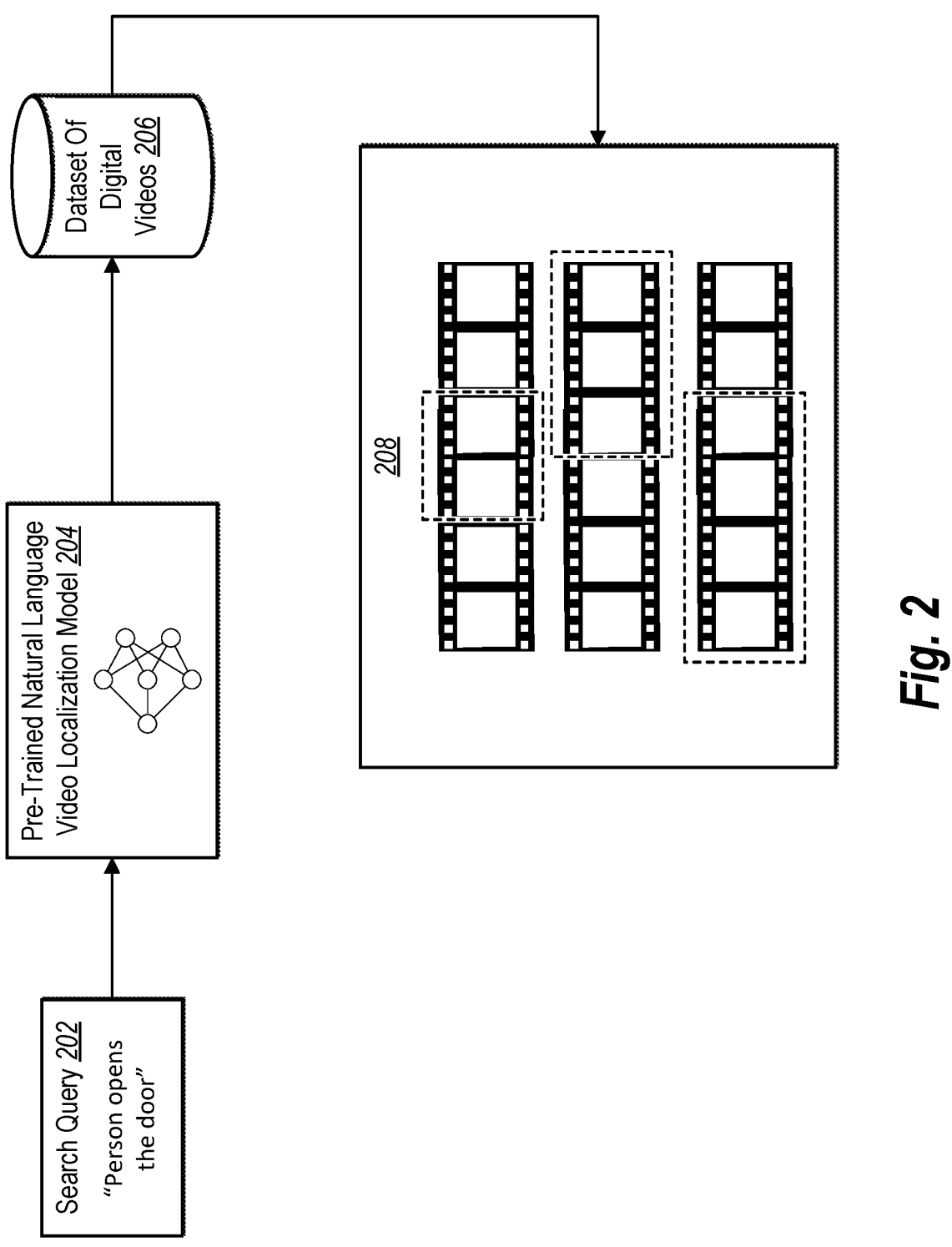
FIG. 2 illustrates an overview of the video dataset localization system providing one or more indications of video content from a dataset of digital videos to a client device in accordance with one or more embodiments.

As mentioned above, in certain embodiments, the video dataset localization system 102 102 utilizes a pre-trained natural language video localization model to identify one or more indications of video content within a dataset of digital videos. FIG. 2 illustrates an overview of the video dataset localization system 102 providing one or more indications of video content from a dataset of digital videos in accordance with one or more embodiments.

For example, FIG. 2 shows the video dataset localization system 102 receiving a search query 202. In one or more embodiments, the video dataset localization system 102 processes the search query 202. In particular, the video dataset localization system 102 receives the search query 202 for searching a dataset of digital videos 206. Further, the search query 202 includes one or more concepts for the video dataset localization system 102 to search within the dataset of digital videos 206. Specifically, the search query 202 includes concepts such as "person opening the door" or "dog chasing a frisbee." To illustrate, the video dataset localization system 102 processes the search query 202 to search for one or more moments in one or more digital videos of the dataset of digital videos 206 that corresponds with the search query 202 ("person opening the door" or "dog chasing a frisbee").

In one or more embodiments, the search query 202 includes multiple concepts. For instance, a concept includes an idea that represents a category or class. Further, the concept includes a category or class to group together similar objects, events, or ideas. To illustrate, for the search query 202 "dog chasing a frisbee," this search query includes the concepts of "a dog," "chasing," and "a frisbee."

FIG. 2 shows the video dataset localization system 102 utilizing a pre-trained natural language video localization model 204. For example, video dataset localization system 102 trains a natural language video localization model on a curated dataset that excludes a subset of false-negative samples and includes a subset of negative samples. By training the natural language video localization model on the curated dataset, the video dataset localization system 102 generates the pre-trained natural language video localization model. Additional details of the video dataset localization system 102 learning parameters of the natural language video localization model based on the curated dataset is given below in FIGS. 3-6.

In one or more embodiments, the video dataset localization system 102 implements the pre-trained natural language video localization model 204 as a neural network. In one or more embodiments, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

Further, FIG. 2 shows the video dataset localization system 102 utilizing the pre-trained natural language video localization model 204 to search amongst the dataset of digital videos 206 based on the search query 202. In one or more embodiments, the video dataset localization system 102 processes the search query 202 to locate one or more moments within the dataset of digital videos 206. For example, the dataset of digital videos 206 includes a structured collection of data organized and stored in a format for access and management. In particular, in some embodiments the dataset of digital videos 206 includes a plurality of various files in one or more formats. Specifically, the video dataset localization system 102 utilizes the dataset digital videos 206 which includes a plurality of digital video files (e.g., a couple of digital videos to millions of digital videos).

In one or more embodiments a digital video includes a file format that encodes and stores visual and audio information in a digital format. In particular, the digital video includes a representation of a series of images (e.g., frames) captured via a video stream. Moreover, each frame of a digital video contains pixels which define the appearance of the frame. Furthermore, the audio of the digital video corresponds with each frame of the digital video. Moreover, the video dataset localization system 102 stores the digital video in the dataset in a variety of formats such as MP4, AVI, or MOV.

Moreover, FIG. 2 shows the video dataset localization system 102 identifying/detecting one or more indications 208 of video content of digital videos from the dataset of digital videos 206. For instance, as shown in FIG. 2, the hashed lines around each of the digital videos shown indicates identifying/detecting a specific indication 208 of video content that corresponds to the search query 202.

In one or more embodiments, identifying/detecting one or more indications of video content includes the video dataset localization system 102 identifying/detecting a digital video file, a frame of a digital video (e.g., frame number twenty-four), or a timestamp of a digital video. For instance, a timestamp includes a point or moment of a digital video that corresponds with a specific frame of the digital video. In particular, a timestamp includes an hour, minute, second, and millisecond indication at which a specific event occurs or at where a specific frame is captured. For instance, for the query "a person opening the door" the disclosed system identifies a timestamp within a digital video that corresponds with the search query 202 (e.g., a timestamp at 2 minutes, 24 seconds and 34 milliseconds). Additional details regarding the process of the video dataset localization system 102 identifying/detecting one or more timestamps in the dataset of digital videos 206 is given below in FIGS. 3-4.

In one or more embodiments, the video dataset localization system 102 causes a client device to display each digital video that includes a moment that corresponds with the search query. In some embodiments, the video dataset localization system 102 causes the client device to display a specific timestamp highlighted within each digital video that is specific to the search query 202. In one or more embodiments, the video dataset localization system 102 causes the client device to display the identified/detected digital videos in a ranked order list, ranked from most similar to the search query 202 to least similar to the search query 202.

Further, in some embodiments, the video dataset localization system 102 provides each identified/detected digital video with text corresponding with each digital video that indicates a number of moments within each video that corresponds with the search query 202. Moreover, in response to receiving a selection of a provided digital video, the video dataset localization system 102 causes the client device to expand the digital video to show each indication of video content identified/detected by the video dataset localization system 102.

Figure 3:
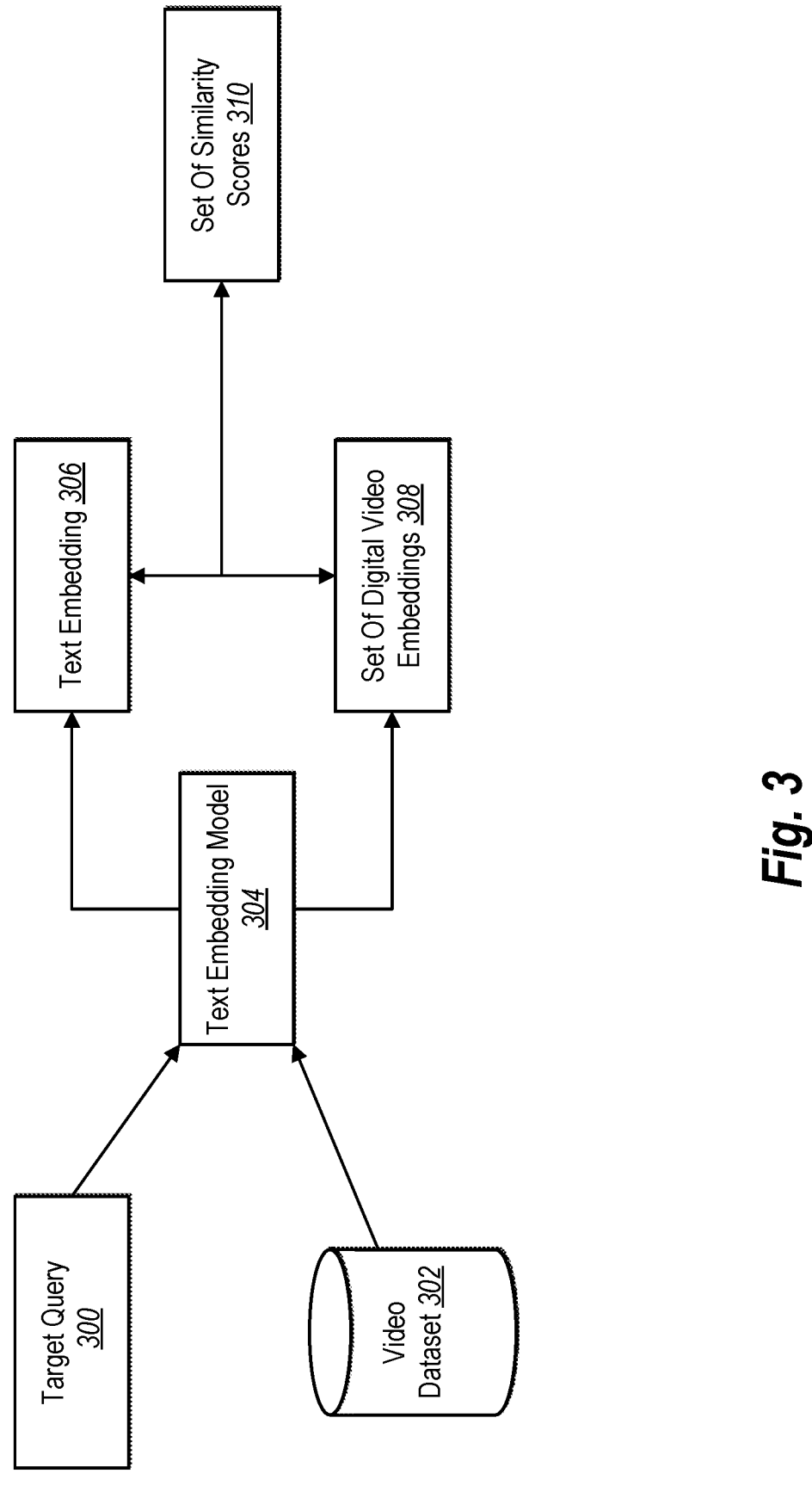
FIG. 3 illustrates a diagram of the video dataset localization system generating a set of similarity scores in accordance with one or more embodiments.

As mentioned above, in certain embodiments, the video dataset localization system 102 generates a set of similarity scores. FIG. 3 illustrates the video dataset localization system 102 generating a set of similarity scores from a target query and a video dataset in accordance with one or more embodiments.

As shown in FIG. 3, the video dataset localization system 102 receives a target query 300. In one or more embodiments, the video dataset localization system 102 processes the target query 300 at training time (e.g., the video dataset localization system 102 learns parameters). In particular, the video dataset localization system 102 receives the target query 300 which includes one or more concepts and the video dataset localization system 102 locates a specific moment from one or more digital videos within a video dataset 302 (e.g., a training dataset) based on the target query 300. Specifically, the target query 300 with one or more concepts indicates to the video dataset localization system 102 to identify one or more moments (e.g., timestamps) that correspond with the target query 300. Furthermore, the video dataset localization system 102 utilizes the target query 300 to curate a dataset for training a natural language video localization model.

As previously mentioned, FIG. 3 also shows the video dataset localization system 102 receiving/accessing a video dataset 302. Unlike the dataset in FIG. 2 (e.g., dataset of digital videos 206), the video dataset 302 corresponds to the video dataset localization system 102 learning parameters for the natural language video localization model. Moreover, as mentioned, in some embodiments the video dataset 302 comes from a public natural language video localization dataset.

Further, FIG. 3 shows the video dataset localization system 102 utilizing a text embedding model 304 to process the target query 300 and the video dataset 302. In one or more embodiments, the text embedding model 304 includes a component of a neural network to transform textual data (e.g., the text query) into a numerical representation. For instance, the video dataset localization system 102 utilizes the text embedding model 304 to transform the target query 300 or the video dataset 302 into a text vector representation. Further, the video dataset localization system 102 utilizes the text embedding model 304 in a variety of ways. For instance, the video dataset localization system 102 utilizes the text embedding model 304 to i) determine the frequency of individual words in the target query 300 or video captions corresponding to the video dataset 302 (e.g., each word becomes a feature vector), ii) determines a weight for each word within the target query 300 or video captions corresponding to the video dataset 302 to generate a text vector that captures the importance of words, iii) generates low-dimensional text vectors in a continuous vector space that represents words within the target query 300 or video captions corresponding to the video dataset 302, and/or iv) generates contextualized text vectors by determining semantic relationships between words within the target query 300 or video captions corresponding to the video dataset 302.

In one or more embodiments, the video dataset localization system 102 implements the text embedding model 304 in the form of the model described by Goel et al. in CYCLIP: Cyclic Contrastive Language-Image Pretraining, 36th Conference on Neural Information Processing Systems (NeurIPS 2022), which is incorporated by reference herein in its entirety. Alternatively, the video dataset localization system 102 implements the model described by Gu et al. in Unified Pretraining Framework for Document Understanding, 35th Conference on Neural Information Processing Systems (NeurIPS 2021), which is incorporated by reference herein in its entirety. In still further implementations, the video dataset localization system 102 implements the model described by Chuang et al. in DiffCSE: Difference-based contrastive learning for sentence embeddings, In Proceedings of the 2022 Conference of the North American Chapter of the Association for Computational Linguistics: Human Language Technologies, pages 4207-4218, Seattle, United States. Association for Computational Linguistics, which is incorporated by reference herein in its entirety, or another model.

Moreover, FIG. 3 shows the video dataset localization system 102 generating a text embedding 306 from the text embedding model 304. In one or more embodiments, the video dataset localization system 102 generates the text embedding 306 from the target query 300. In particular, in some embodiments the text embedding 306 includes a numerical representation of textual data that captures the semantic and/or contextual meaning of the words in the target query 300. Further, the video dataset localization system 102 utilizes the text embedding 306 to understand the meaning and relationship of words within the target query 300.

Further, FIG. 3 shows the video dataset localization system 102 generating a set of digital video embeddings 308. For example, FIG. 3 shows the video dataset localization system 102 generating the set of digital video embeddings 308 from the text embedding model 304. In particular, the set of digital video embeddings 308 corresponds to the video dataset 302. Specifically, the video dataset localization system 102 generates the set of digital video embeddings 308 for an accurate comparison against the text embedding 306 of the target query 300. Furthermore, in some embodiments, the video dataset localization system 102 generates the set of digital video embeddings 308 from digital video captions corresponding with the digital videos of the video dataset 302. Additional details relating to the digital video captions is given below in FIG. 4.

Furthermore, FIG. 3 shows a comparison between the text embedding 306 and the set of digital video embeddings 308. In particular, FIG. 3 shows the video dataset localization system 102 generating a set of similarity scores 310 from the comparison between the text embedding 306 and the set of digital video embeddings 308. For instance, the disclosed system determines cosine similarities between the digital videos of the video dataset 302 and the target query 300. As mentioned, more details regarding the comparison are given below in FIG. 4.

Although the discussion for FIG. 3 above relates to generating the set of similarity scores 310 for the video dataset localization system 102 to learn parameters of the natural language video localization model, in one or more embodiments, the principles discussed above also relate to inference time. In other words, in one or more embodiments, at inference time of an implemented natural language video localization model, the video dataset localization system 102 also generates the set of similarity scores 310. For instance, at inference time, the video dataset localization system 102 receives a search query (e.g., similar to the target query 300) and processes the search query with the text embedding model 304. Furthermore, the video dataset localization system 102 at inference time processes a dataset of digital videos via the text embedding model 304 to generate a set of digital video embeddings that corresponds with the dataset. Specifically, the dataset at inference time includes the video dataset localization system 102 searching for a video moment within the dataset that corresponds with the search query. Moreover, at inference time the video dataset localization system 102 also generates a set of similarity scores between the text embedding of the search query and the set of digital video embeddings that corresponds with the dataset. Accordingly, at inference time or training time, the video dataset localization system 102 performs similar processes as described above in FIG. 3.

Figure 4:
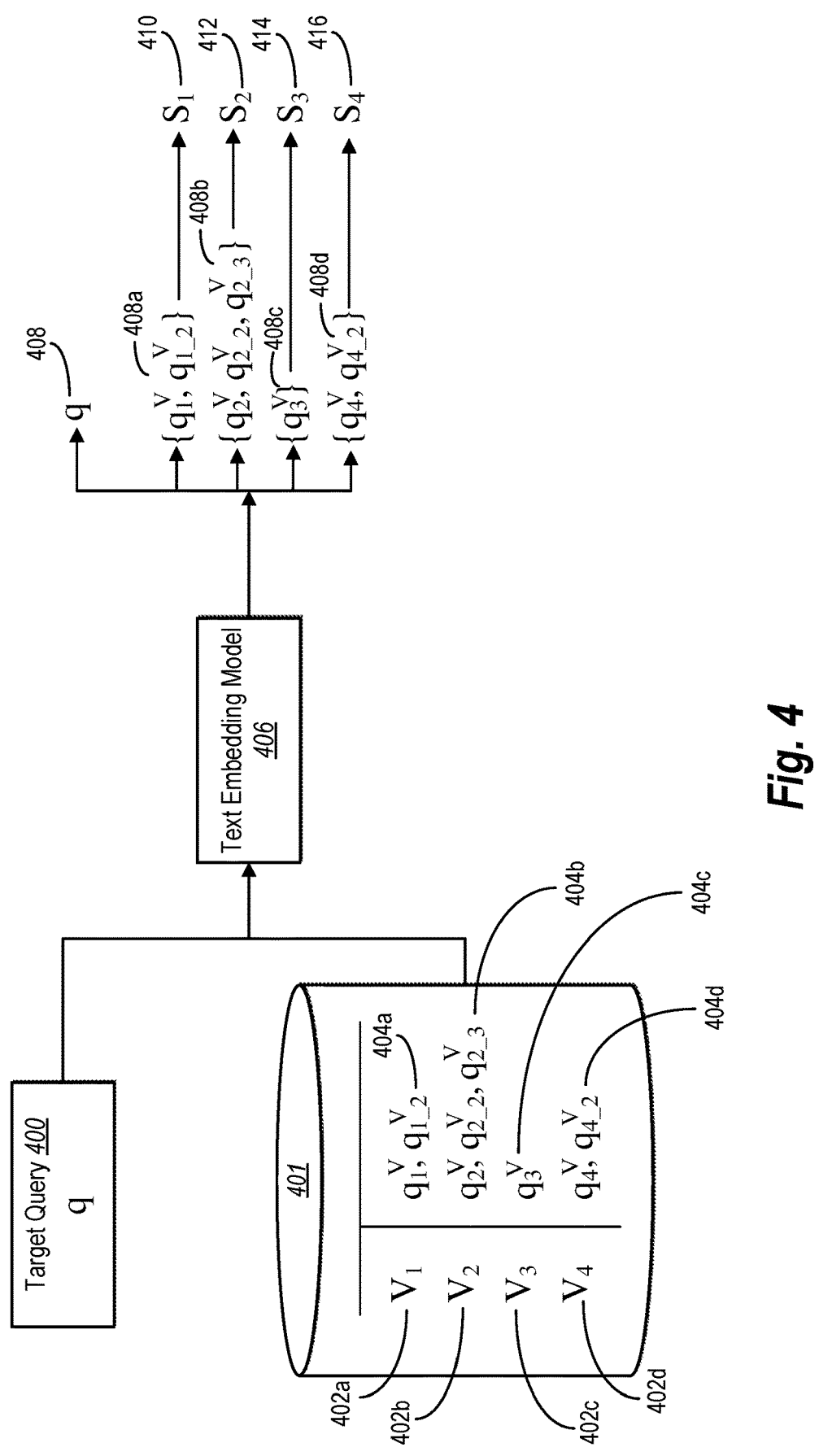
FIG. 4 illustrates a diagram of the video dataset localization system utilizing a text embedding model in accordance with one or more embodiments.

As mentioned above, the video dataset localization system 102 generates similarity scores between video captions corresponding with digital videos and a target query. FIG. 4 shows the video dataset localization system 102 generating a set of similarity scores in accordance with one or more embodiments. FIG. 4 illustrates the video dataset localization system 102 processing a target query 400 and a video dataset 401 via a text embedding model 406, which was discussed above.

As shown in FIG. 4, the video dataset localization system 102 processes the target query 400 via the text embedding model 406 to generate a text embedding 408. Further, FIG. 4 also shows the video dataset 401 that includes multiple digital videos, such as digital videos 402*a*-402*d*. As shown in FIG. 4, the digital videos 402*a*-402*d* contain a corresponding set of video captions 404*a*-404*d*. In particular, the digital video captions 404*a*-404*d* include textual descriptions of digital videos 402*a*-402*d*. Further, in some embodiments, a digital video includes multiple digital video captions. In the instance where a digital video includes multiple digital video captions, a digital video caption corresponds with a specific frame of the digital video. To illustrate, FIG. 4 shows a first set of digital video captions 404*a* that includes two video captions, a second set of digital video captions 404*b* that includes four video captions, a third set of digital video captions 404*c* that includes a single video caption, and a fourth set of digital video captions 404*d* that includes two video captions.

In one or more embodiments, the digital videos 402*a*-402*d* includes a single video caption for each of the digital videos 402*a*-402*d*. In other embodiments, the digital videos 402*a*-402*d* include multiple video captions corresponding to each of the digital videos 402*a*-402*d*. In some embodiments, the digital videos 402*a*-402*d* include a mix of some videos having a single video caption and some videos having multiple video captions. In some embodiments, the digital videos 402*a*-402*d* contain a video caption for each frame of each of the digital videos 402*a*-402*d*.

Furthermore, FIG. 4 shows the video dataset localization system 102 generating a set of digital video embeddings for the digital video captions 404*a*-404*d* via the text embedding model 406. In particular, FIG. 4 shows a first set of digital video embeddings 408*a*, a second set of digital video embeddings 408*b*, a third set of digital video embeddings 408*c*, and a fourth set of digital video embeddings 408*d*.

Moreover, FIG. 4 shows the video dataset localization system 102 comparing the text embedding 408 with each of the sets of digital video embeddings 408*a*-408*d*. In particular, the video dataset localization system 102 compares the text embeddings 408 with each of the sets of digital video embeddings 408*a*-408*d* to generate a set of similarity scores. To illustrate, FIG. 4 shows a first similarity score 410 that corresponds to the comparison between the text embedding 408 and the first set of digital video embeddings 408*a*. Further, FIG. 4 shows a second similarity score 412, a third similarity score 414, and a fourth similarity score 416.

In one or more embodiments, the video dataset localization system 102 calculates the set of similarity scores 410-416 by utilizing a cosine similarity. In particular, the video dataset localization system 102 represents the videos of the dataset 401 as V={v₁, . . . , v_{|v|}} and represents corresponding digital video captions (e.g., queries) as $$Q^v = \{\{q_1^v, \ldots, q_m^v\}.$$

Furthermore, the video dataset localization system 102 represents each video as v, and m represents the number of digital video captions (e.g., text queries) included in the video. In one or more embodiments, the video dataset localization system 102 utilizes the digital video captions to obtain a semantic understanding of each digital video. Furthermore, for a set of digital video captions (e.g., the first set of digital video captions 404*a*), the video dataset localization system 102 represents the set of digital video captions as $$E^v = \{e_{q_1^v}, \ldots, e_{q_m^v}\}.$$

Specifically, the video dataset localization system 102 embeds all text queries $Q^v$ included within a specific digital video v. Accordingly, the video dataset localization system 102 calculates the cosine similarity between the target query 400 (q) and a video, represented as $$s(q, q_1^v).$$

For instance, the video dataset localization system 102 defines the similarity of $$s(q, q_1^v)$$

as:

$$s(q, v) = \max(\{s(q, q_1^v), \ldots, s(q, q_m^v)\})$$

Based on the above equation, in one or more embodiments, the video dataset localization system 102 utilizes the highest similarity score between a digital video caption and the target query 400 as the similarity of the target query 400 with that particular digital video. To illustrate, for the first set of digital video captions 404*a*, if the second digital video caption contains the highest similarity score with the target query 400 as compared to the first digital video caption, then the video dataset localization system 102 treats the similarity score of the second digital video caption as representative of the first digital video 402*a*.

As described above, the video dataset localization system 102 generates embeddings for textual queries and digital videos in a common embedding space. As described above, in one or more implementations this is performed utilizing a text embedding model on textual queries and video captions. In alternative implementations, the video dataset localization system 102 utilizes a text embedding model for the textual queries and another model that generates embeddings for visual content (e.g., video frames) in the same space, such as that described by Goel et al. in CYCLIP: Cyclic Contrastive Language-Image Pretraining, 36th Conference on Neural Information Processing Systems (NeurIPS 2022), which is incorporated by reference herein in its entirety.

Figure 5:
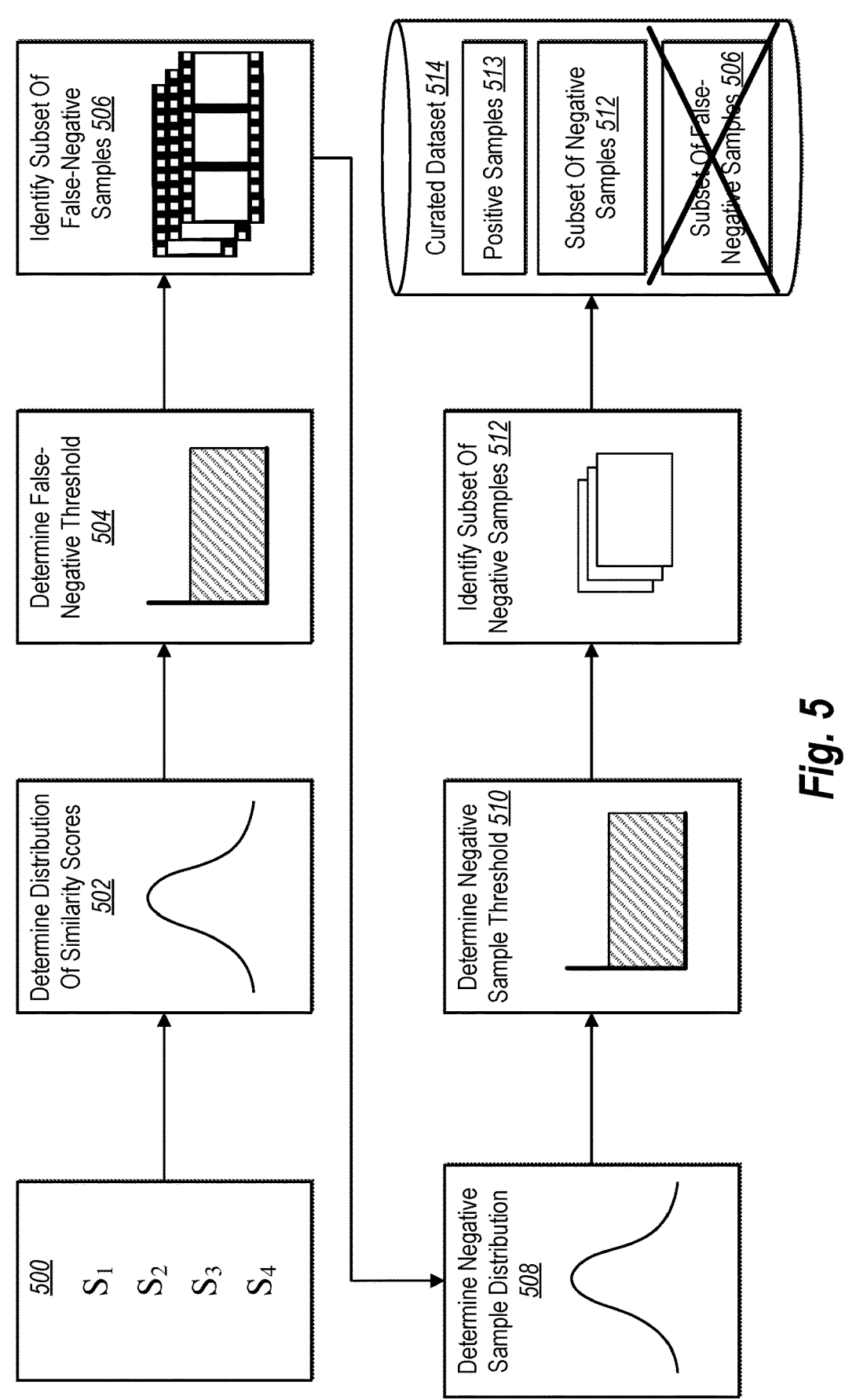
FIG. 5 illustrates a diagram of the video dataset localization system generating a curated dataset in accordance with one or more embodiments.

As mentioned above, the video dataset localization system 102 generates a curated dataset. FIG. 5 illustrates the video dataset localization system 102 generating a curated dataset from a set of similarity scores in accordance with one or more embodiments. For example, FIG. 5 shows the video dataset localization system 102 utilizing a set of similarity scores 500 (e.g., the set of similarity scores 310 and the set of similarity scores 410-416 as discussed above).

Further, FIG. 5 shows the video dataset localization system 102 determining a sample distribution 502 of the set of similarity scores 500. For example, the set of similarity scores 500 represents the similarity of each of the digital videos in a video dataset to a target query. Thus, the sample distribution 502 models the statistical distribution of the set of similarity scores 500 for the digital videos in the video dataset. In particular, the video dataset localization system 102 determines the sample distribution 502 by calculating a mean distribution value and a standard deviation value of the set of similarity scores 500. Moreover, in one or more embodiments, the video dataset localization system 102 predetermines a threshold similarity score of the sample distribution 502 that indicates any digital video below the threshold similarity score is considered a negative sample. To illustrate, the video dataset localization system 102 predetermines that a digital video with a similarity score below 0.5 is considered a negative sample.

Furthermore, as shown in FIG. 5, based on the just mentioned threshold similarity score for being considered a negative sample (e.g., 0.5), the video dataset localization system 102 determines a false-negative threshold 504. In particular, the video dataset localization system 102 determines that the false-negative threshold 504 includes digital videos above and within a certain range of the threshold similarity score to be considered a false-negative sample. To illustrate, the video dataset localization system 102 determines that digital videos with a similarity score between 0.75-0.85 are within the false-negative threshold 504. Accordingly, the video dataset localization system 102 identifies digital videos of the dataset of digital videos with a similarity score falling within the false-negative threshold 504.

Moreover, FIG. 5 shows the video dataset localization system 102 identifying a subset of false-negative samples 506. For example, as mentioned above, the video dataset localization system 102 utilizes the false-negative threshold 504 to identify the subset of false-negative samples 506. In particular, a false-negative sample includes one or more frames of a digital video that are mistakenly classified as a negative sample when it should have been classified as a positive sample. For instance, the video dataset localization system 102 incorrectly fails to identify a frame of a digital video that belongs to a positive class (e.g., a person opening a door).

Additionally, in one or more embodiments the video dataset localization system 102 excludes the subset of false-negative samples 506. In particular, the video dataset localization system 102 excludes the subset of false-negative samples 506 to not be included within the dataset of digital videos for the video dataset localization system 102 to subsequently generate the curated dataset.

As shown in FIG. 5, the video dataset localization system 102 determines a negative sample distribution 508. In particular, as just mentioned, the video dataset localization system 102 in determining the negative sample distribution 508 does not consider the excluded subset of false-negative samples 506. In one or more embodiments, the video dataset localization system 102 utilizes negative samples for training a natural language video localization model. For example, a negative sample includes one or more moments (e.g., timestamps) of a digital video that falls under a class or category considered not relevant to a target query. For instance, for a target query relating to "person opening a door," a negative sample would include one or more frames of a digital video that do not show "a person opening a door." In contrast, a positive sample would include one or more frames of a digital video that do show "a person opening a door." Further, in some embodiments, the video dataset localization system 102 utilizes negative samples for training the natural language video localization model to identify what is not considered a positive sample.

Further, the video dataset localization system 102 in determining the negative sample distribution 508, the video dataset localization system 102 determines a mean distribution value and a standard deviation distribution value of the set of similarity scores with the subset of false-negative samples 506 excluded. Accordingly, with the subset of false-negative samples 506 excluded, the video dataset localization system 102 utilizes a predetermined similarity score as indicating negative samples. For instance, as shown in FIG. 5, the video dataset localization system 102 determines a negative sample threshold 510, which indicates a range of similarity scores that indicates negative samples. To illustrate, the video dataset localization system 102 predetermines that the range of 0-0.4 indicates negative samples.

In one or more embodiments, the video dataset localization system 102 identifies a specific subset of negative samples to avoid issues involved with "easy negative video samples." In other words, the video dataset localization system 102 enhances the ability of learning parameters for a natural language video localization model by utilizing "difficult" negative samples (e.g., negative samples with a low similarity score to a target query).

Furthermore, as shown in FIG. 5, the video dataset localization system 102 identifies a subset of negative samples 512 that falls within the negative sample threshold 510. In particular, the video dataset localization system 102 utilizes the subset of negative samples 512 that falls within the negative sample threshold 510 as part of the curated dataset 514. For instance, the video dataset localization system 102 includes the subset of negative samples 512 within the curated dataset 514 to train the natural language video localization model on negative examples corresponding with a target query.

As shown in FIG. 5, the video dataset localization system 102 generates the curated dataset 514. In particular, the curated dataset 514 includes the subset of negative samples 512 with the subset of false-negative samples 506 excluded. Furthermore, as shown, the curated dataset 514 also includes positive samples 513. In other words, the video dataset localization system 102 generates the curated dataset 514 by including the subset of negative samples 512, excluding the subset of false-negative samples 506 and including the positive samples 513 from the dataset of digital videos.

In one or more embodiments, the video dataset localization system 102 constructs the curated dataset by utilizing public natural language video localization datasets (NLVL) which are described in Jiyang Gao, Chen Sun, Zhenheng Yang, and Ram Nevatia. 2017. TALL: temporal activity localization via language query. In IEEE International Conference on Computer Vision, ICCV 2017, Venice, Italy, Oct. 22-29, 2017, pages 5277-5285. IEEE Computer Society, Ranjay Krishna, Kenji Hata, Frederic Ren, Li Fei-Fei, and Juan Carlos Niebles. 2017. Dense-captioning events in videos. In IEEE International Conference on Computer Vision, ICCV 2017, Venice, Italy, Oct. 22-29, 2017, pages 706-715. IEEE Computer Society, and Michaela Regneri, Marcus Rohrbach, Dominikus Wet456 zel, Stefan Thater, Bernt Schiele, and Manfred Pinkal. 2013. Grounding action descriptions in videos. Transactions of the Association for Computational Linguistics, 1:25-36, which are fully incorporated by reference herein. Accordingly, the video dataset localization system 102 utilizes public NLVL datasets and curates a dataset for learning enhanced parameters based on the principles discussed above.

As mentioned above, the video dataset localization system 102 determines the negative sample distribution 508. In particular, the negative sample distribution 508 indicates possible or probable video samples that could be classified as negative samples. In one or more embodiments, the video dataset localization system 102 calculates probabilities of video samples being a negative sample. For instance, the video dataset localization system 102 represents potential negative sample candidates as $V^c$. Based on the negative sample distribution 508, the video dataset localization system 102 defines a negative video sampling probability (p). To illustrate, the video dataset localization system 102 represents the negative sample candidates as:

$$V_q^c = \{v \mid s(q, v) < \mu + t * \sigma\}$$

The above equation indicates that the video dataset localization system 102 defines a negative sample candidate by the similarity score of a target query-video pair being less than the mean of the negative sample distribution 508 plus the product of the standard deviation and a predetermined threshold. Additionally, the video dataset localization system 102 represents the negative videos sampling probability as:

$$p_q(v) \propto \exp(-a * s(q, v) + b),$$

$$\forall v \in V_q^c$$

The above equation indicates that the video dataset localization system 102 defines the negative videos sampling probability as being proportional to the exponential function of $-a$ multiplied by the similarity score of a target query-video pair+b. The "a" and "b" variables in this case indicates defining the tightness or spread of the negative sample distribution 508. To illustrate, the video dataset localization system 102 establishes a=5.0 and b=0.0 in defining the negative sampling distribution. Moreover, the above equation also indicates that the negative videos sampling probability only applies to all videos considered a negative sample candidate.

As mentioned earlier, the video dataset localization system 102 excludes the subset of false-negative samples 506. In one or more embodiments, the video dataset localization system 102 defines the false-negative threshold 504 as exceeding μ+t*σ. In particular, the larger the predetermined value t, the more strictly the video dataset localization system 102 selects the false-negative samples to exclude.

Moreover, in one or more embodiments, the video dataset localization system 102 performs an n−1 negative sampling based on the negative videos sampling probability (e.g., with the subset of false-negative samples 506 excluded) to derive the negative samples, which the video dataset localization system 102 represents as $$V_q^- = \{v_1^-, \dots v_{n-1}^-\}.$$

In other words, the video dataset localization system 102 determines the probability of a video sampling being a negative sample based on its inverse proportionality to its similarity to the target query.

16

Figure 6:
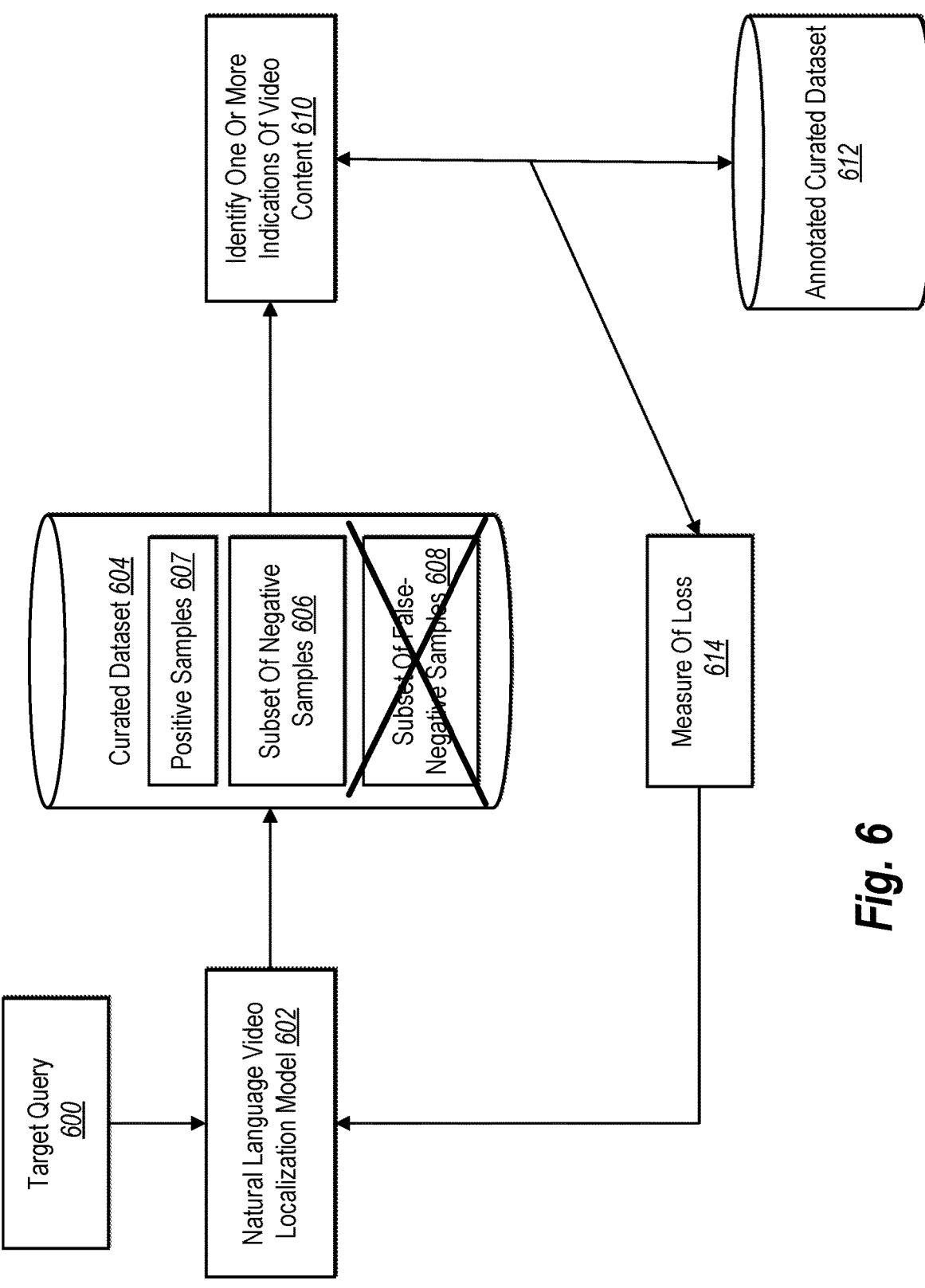
FIG. 6 illustrates a diagram of the video dataset localization system learning parameters of the natural language video localization model based on the curated dataset in accordance with one or more embodiments.

As mentioned above, the video dataset localization system 102 learns parameters of the natural language video localization model. FIG. 6 illustrates the video dataset localization system 102 training a natural language video localization model based on a curated dataset in accordance with one or more embodiments.

FIG. 6 shows the video dataset localization system 102 processing a target query 600 with a natural language video localization model 602. Further, as shown in FIG. 6, in response to the target query 600, the video dataset localization system 102 searches amongst a curated dataset 604 to locate a video moment that corresponds with the target query 600. Moreover, FIG. 6 shows the curated dataset 604 includes a subset of negative samples 606, positive samples 607, and a subset of false-negative samples 608 excluded. Additionally, FIG. 6 shows the video dataset localization system 102 identifying one or more indications 610 of video content based on the target query and the curated dataset 604. For instance, as discussed previously, the video dataset localization system 102 generates a text embedding for the target query 600 and a set of digital video embeddings for the curated dataset 604 and calculates a set of similarity scores. Further, the video dataset localization system 102 identifies the one or more indications 610 of video content by taking the highest similarity scores (e.g., within a predetermined range).

In one or more embodiments, the video dataset localization system 102 samples a subset of negative samples 606 from a negative sample distribution to include within the curated dataset 604. Further, the video dataset localization system 102 includes the positive samples 607 that correspond to a target query 600 and also excludes the subset of false-negative samples 608 from the curated dataset 604. Accordingly, the video dataset localization system 102 utilizes the curated dataset 604 to learn parameter of the natural language video localization model 602. In particular, the video dataset localization system 102 receives a video-query pair $$(v^+, q)$$

and a negative video set $$V_q^- = \{v_1^-, \dots v_{n-1}^-\}.$$

The video dataset localization system 102 then localizes a temporal moment (e.g., represented as $(x_s^v, x_e^v)$) of a specific video v that matches the query from a massive sample video set $$V_q^{+,-} = \{v^+, v_1^-, \dots v_{n-1}^-\}.$$

Furthermore, the video dataset localization system 102 retrieves an optimal positive moment $$(x_s^{v+}, x_e^{v+})$$

that matches semantically with the text query (q). Moreover, the video dataset localization system 102 generates similarity scores (e.g., confidence scores) and selects temporal moments from positive samples with the highest scores as a prediction.

Furthermore, based on the video dataset localization system 102 generating predictions for positive samples from the curated dataset 604 that corresponds with the target query 600, the video dataset localization system 102 then determines a measure of loss 614. In one or more embodiments, the determined measure of loss 614 comprises a binary cross-entropy loss.

As shown in FIG. 6, the video dataset localization system 102 determines the measure of loss 614 by comparing the identified one or more positive sample predictions that corresponds with the target query 600 to an annotated curated dataset 612. The annotated curated dataset 612 contains ground truth labels corresponding to each digital video. By comparing the positive sample predictions with the annotated curated dataset 612, the video dataset localization system 102 determines the measure of loss 614.

Moreover, as shown in FIG. 6, the video dataset localization system 102 modifies parameters of the natural language video localization model 602 based on the determined measure of loss. In doing so, the video dataset localization system 102 learns parameters of the natural language video localization model 602 based on the curated dataset.

As mentioned above, in one or more implementations the natural language video localization model 602 comprises a neural network. For example, in one or more implementations the natural language video localization model 602 comprises a cross-encoder architecture or a dual-encoder architecture. More specifically, in one or more implementations, the natural language video localization model 602 comprises a cross-encoder transformer or a bi-encoder transformer. In one or more implementations, the natural language video localization model 602 comprises a Siamese-alike network architecture with late modality fusion as described by Wang. et al. in Negative sample matters: A renaissance of metric learning for temporal grounding, In Proceedings of the AAAI Conference on Artificial Intelligence, volume 36, pages 2613-2623, the entire contents of which are hereby incorporated by reference. Alternatively, the natural language video localization model 602 comprises a cross-encoder transformer as described by Vaswani et al. in Attention Is All You Need, In Advances in Neural Information Processing Systems 30: Annual Conference on Neural Information Processing Systems 2017 Dec. 4-9, the entire contents of which are hereby incorporated by reference. In still further implementations, the natural language video localization model 602 comprises a bi-encoder transformer that encodes text and video clip features independently as described by Lee et al. in Learning dense representations of phrases at scale, In Proceedings of the 59th Annual Meeting of the Association for Computational Linguistics and the 11th International Joint Conference on Natural Language Processing (Volume 1: Long 441 Papers), pages 6634-6647, the entire contents of which are hereby incorporated by reference.

Figure 7:
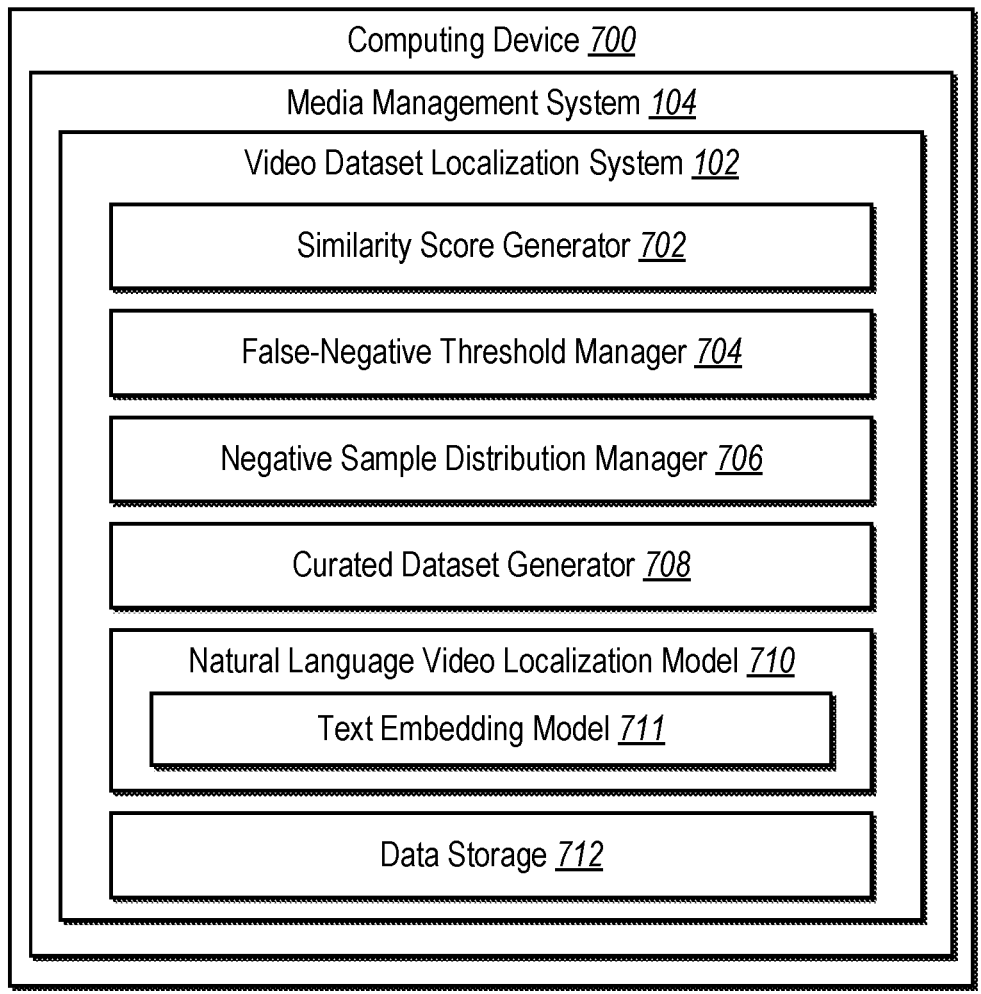
FIG. 7 illustrates an example schematic diagram of the video dataset localization system in accordance with one or more embodiments.

Turning to FIG. 7, additional detail will now be provided regarding various components and capabilities of the video dataset localization system 102. In particular, FIG. 7 illustrates an example schematic diagram of a computing device 700 (e.g., the server(s) 106 and/or the client device 110) implementing the video dataset localization system 102 in accordance with one or more embodiments of the present disclosure for components 800-812. As illustrated in FIG. 7, the video dataset localization system 102 includes a similarity score generator 702, a false-negative threshold manager 704, a negative sample distribution manager 706, a curated dataset generator 708, a natural language video localization model 710, and a data storage 712.

The similarity score generator 702 generates similarity scores. For example, the similarity score generator 702 generates a set of similarity scores between a target query and a video dataset. In particular, the similarity score generator 702 processes a query and a video dataset via a text embedding model and compares a text embedding of the query and a set of digital video embeddings. Furthermore, the similarity score generator 702 calculates a cosine similarity between the text embedding and each of the digital video embeddings. Moreover, the similarity score generator 702 collaborates with other components by providing the set of similarity scores to the other components.

The false-negative threshold manager 704 determines a false-negative threshold. For example, the false-negative threshold manager 704 determines the false-negative threshold by utilizing the set of similarity scores to exclude a subset of false-negative samples. Further, in some embodiments the false-negative threshold manager 704 pre-determines a false-negative threshold. In some embodiments, the false-negative threshold manager 704 determines the false-negative threshold from the set of similarity scores. Specifically, the false-negative threshold manager 704 determines a sample distribution of the similarity scores and determines a false-negative threshold based on the sample distribution.

The negative sample distribution manager 706 determines a negative sample distribution. For example, the negative sample distribution manager 706 determines the negative sample distribution based on the target query (e.g., the set of similarity scores) with the subset of false-negatives excluded. In particular, the negative sample distribution manager 706 determines a mean value distribution and a standard deviation value distribution for the remaining digital videos. Moreover, in some embodiments, the negative sample distribution manager 706 utilizes the negative sample distribution to identify a subset of negative samples to include within a curated dataset.

The curated dataset generator 708 generates a curated dataset. For example, the curated dataset generator 708 generates the curated dataset that includes positive samples, a subset of negative samples (e.g., identified from the negative sample distribution), and with the subset of false-negative samples excluded. Furthermore, the curated dataset generator 708 provides the curated dataset to the natural language video localization model 710 to further learn parameters of the natural language video localization model.

The natural language video localization model 710 learns parameters. For example, the natural language video localization model 710 learns parameters utilizing the curated dataset. In particular, the natural language video localization model 710 modifies parameters of components within the natural language video localization model based on a determined measure of loss, determined from the curated dataset and a target query.

Furthermore, FIG. 7 shows the natural language video localization model 710 includes a text embedding model 711. For example, the text embedding model 711 processes queries and datasets of digital videos. In particular, the text embedding model 711 processes the queries and the datasets of digital videos to generate a text embedding of the query and a set of digital video embeddings.

The data storage 712 (e.g., implemented via one or more memory devices) stores digital videos, training data, queries, various machine learning models, and ground truth annotations. For example, the data storage 712 stores queries received as input, stores video datasets, stores curated datasets, and stores training parameters.

Each of the components 802-812 of the video dataset localization system 102 can include software, hardware, or both. For example, the components 802-812 can include one or more instructions stored on a computer-readable storage medium and executable by processors of one or more computing devices, such as a client device or server device. When executed by the one or more processors, the computer-executable instructions of the video dataset localization system 102 can cause the computing device(s) to perform the methods described herein. Alternatively, the components 802-812 can include hardware, such as a special-purpose processing device to perform a certain function or group of functions. Alternatively, the components 802-812 of the video dataset localization system 102 can include a combination of computer-executable instructions and hardware.

Furthermore, the components 802-812 of the video dataset localization system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-812 of the video dataset localization system 102 may be implemented as a stand-alone application, such as a desktop or mobile application. Furthermore, the components 802-812 of the video dataset localization system 102 may be implemented as one or more web-based applications hosted on a remote server. Alternatively, or additionally, the components 802-812 of the video dataset localization system 102 may be implemented in a suite of mobile device applications or "apps." For example, in one or more embodiments, the video dataset localization system 102 can comprise or operate in connection with digital software applications such as ADOBE® CREATIVE CLOUD EXPRESS, ADOBE® PHOTOSHOP, ADOBE® ILLUSTRATOR, ADOBE® PREMIERE, ADOBE® INDESIGN, and/or ADOBE® EXPERIENCE CLOUD. "ADOBE," "PHOTOSHOP," "INDESIGN," and "ILLUSTRATOR". The foregoing are either registered trademarks or trademarks of Adobe Inc. in the United States and/or other countries.

FIGS. 1-7, the corresponding text, and the examples provide a number of different methods, systems, devices, and non-transitory computer-readable media of the video dataset localization system 102. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for learning parameters for a model in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a method. For example, in some embodiments, the acts of FIG. 8 are performed as part of a computer-implemented method. Alternatively, a non-transitory computer-readable medium can store instructions thereon that, when executed by at least one processor, cause a computing device to perform the acts of FIG. 8. In some embodiments, a system performs the acts of FIG. 8. For example, in one or more embodiments, a system includes at least one memory device. The system further includes at least one server device configured to cause the system to perform the acts of FIG. 8.

The series of acts 800 includes an act 802 of generating a curated dataset with a subset of negative samples and without the subset of false-negative samples. For example, the series of acts 800 includes an act 804 of generating a set of similarity scores between a target query and a video dataset. Moreover, the series of acts 800 includes an act 806 of determining a false-negative threshold by utilizing the set of similarity scores to exclude a subset of false-negative samples. Additionally, the series of acts 800 includes an act 808 of determining a negative sample distribution for the plurality of digital videos based on the target query. Furthermore, the series of acts 800 includes an act 810 of learning parameters for a natural language video localization model.

In particular, the act 802 includes generating a curated dataset comprising a subset of negative samples based on the negative sample distribution without the subset of false-negative samples. Further, the act 804 includes generating, utilizing a text embedding model, a set of similarity scores between a target query and a video dataset comprising a plurality of digital videos. Moreover, the act 806 includes determining a false-negative threshold by utilizing the set of similarity scores to exclude a subset of false-negative samples from the plurality of digital videos. Furthermore, the act 808 includes determining a negative sample distribution for the plurality of digital videos based on the target query with the subset of false-negative samples excluded. Moreover, the act 810 includes learning parameters for a natural language video localization model utilizing the curated dataset.

For example, in one or more embodiments, the series of acts 800 includes identifying a set of video captions corresponding to the plurality of digital videos and generating, utilizing the text embedding model, digital video embeddings for the set of video captions. In addition, in one or more embodiments, the series of acts 800 includes generating, utilizing the text embedding model, a target query embedding for the target query and generating the set of similarity scores by comparing the target query embedding with the digital video embeddings. Further, in one or more embodiments, the series of acts 800 includes generating a false-negative distribution based on a mean distribution value and standard deviation value of the set of similarity scores.

Moreover, in one or more embodiments, the series of acts 800 includes determining the false-negative threshold for the video dataset comprising the plurality of digital videos based on the false-negative distribution by determining a threshold for negative sample candidates. Further in one or more embodiments, the series of acts 800 includes wherein the false-negative threshold comprises a predetermined similarity score above the threshold for negative sample candidates.

Additionally, in one or more embodiments, the series of acts 800 includes identifying the subset of false-negative samples from the plurality of digital videos based on the subset of false-negative samples satisfying the false-negative threshold. Moreover, in one or more embodiments, the series of acts 800 includes wherein satisfying the false-negative threshold comprises a similarity score of the subset of false-negative samples being above a predetermined similarity score corresponding with negative sample candidates.

Furthermore, in one or more embodiments, the series of acts 800 includes determining a mean distribution value and a standard deviation value of the set of similarity scores with the subset of false-negative samples excluded and identifying the subset of negative samples of the plurality of digital videos from the negative sample distribution.

Moreover, in one or more embodiments, the series of acts 800 includes extracting positive samples corresponding with the target query from the video dataset to include within the curated dataset, including the subset of negative samples within the curated dataset, and excluding the subset of false-negative samples from the curated dataset.

In addition, in one or more embodiments, the series of acts 800 includes generating, utilizing a text embedding model, a set of similarity scores between a target query and a video dataset comprising a plurality of digital videos. Further, in one or more embodiments, the series of acts 800 includes determining a false-negative threshold for the plurality of digital videos. Moreover, in one or more embodiments, the series of acts 800 includes identifying a subset of false-negative samples of the plurality of digital videos to exclude based on the set of similarity scores and the false-negative threshold. Additionally, in one or more embodiments, the series of acts 800 includes determining a negative sample distribution for the plurality of digital videos based on the target query with the subset of false-negative samples excluded.

Further, in one or more embodiments, the series of acts 800 includes identifying a subset of negative samples of the plurality of digital videos based on the negative sample distribution. Moreover, in one or more embodiments, the series of acts 800 includes generating a curated dataset comprising the identified subset of negative samples without the subset of false-negative samples. Further, in one or more embodiments, the series of acts 800 includes learning parameters of a natural language video localization model based on the curated dataset.

Further, in one or more embodiments, the series of acts 800 includes identifying a set of video captions corresponding with the plurality of digital videos, generating, utilizing a text embedding model, digital video embeddings for the set of video captions, generating, utilizing the text embedding model, a target query embedding for the target query, and generating the set of similarity scores by comparing the target query embedding with the digital video embeddings.

Moreover, in one or more embodiments, the series of acts 800 includes generating a false-negative distribution based on the set of similarity scores. Furthermore, in one or more embodiments, the series of acts 800 includes determining a mean distribution value and a standard deviation distribution value for the set of similarity scores with the subset of false-negative samples excluded. Additionally, in one or more embodiments, the series of acts 800 includes determining probability scores for the plurality of digital videos. Further, in one or more embodiments, the series of acts 800 includes wherein the probability scores indicate a likelihood of a digital video of the plurality of digital videos being a negative sample.

FIG. 9 illustrates a flowchart of a series of acts 900 for providing one or more indications of video content to a client device in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

The series of acts 900 includes an act 902 of processing a search query from a client device that indicates one or more concepts, a sub-act 904 of generating a text embedding from the search query, a sub-act 906 of determining a set of digital video embeddings, a sub-act 908 of comparing the text embedding from the search query with the set of digital video embeddings, and an act 910 of providing one or more indications of video content from one or more videos responsive to the search query.

In particular, the act 902 includes processing a search query from a client device that indicates one or more concepts utilizing the pre-trained natural language video localization model, the sub-act 904 includes generating, utilizing a text encoder, a text embedding from the search query, the sub-act 906 includes determining a set of digital video embeddings from a dataset of digital videos, the sub-act 908 includes comparing the text embedding from the search query with the set of digital video embeddings from the dataset of digital videos, and the act 910 includes providing one or more indications of video content from one or more videos responsive to the search query based on the comparison between the set of digital video embeddings and the text embedding.

For example, in one or more embodiments, the series of acts 900 includes determining the set of digital video embeddings by utilizing the text encoder to generate the set of digital video embeddings from digital video captions corresponding with the dataset of digital videos. In addition, in one or more embodiments, the series of acts 900 includes generating a digital video embedding for each video caption.

Further in one or more embodiments, the series of acts 900 includes wherein a digital video of the dataset comprises a first video caption for a first frame of the digital video and a second video caption for a second frame of the digital video. Further, in one or more embodiments, the series of acts 900 includes determining a set of similarity scores between the text embedding and the set of digital video embeddings.

Moreover, in one or more embodiments, the series of acts 900 includes comparing the text embedding from the search query with the set of digital video embeddings by identifying a digital video embedding with a similarity score closest to the text embedding. Additionally, in one or more embodiments, the series of acts 900 includes provide one or more indications of video content by causing the client device to display one or more digital videos responsive to the search query. Moreover, in one or more embodiments, the series of acts 900 includes wherein the one or more indications comprise timestamps corresponding to the one or more digital videos responsive to the search query from the client device. Further, in one or more embodiments, the series of acts 900 includes displaying one or more digital videos responsive to the search query by ranking the one or more digital videos responsive to the search query according to a corresponding similarity score with the search query.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
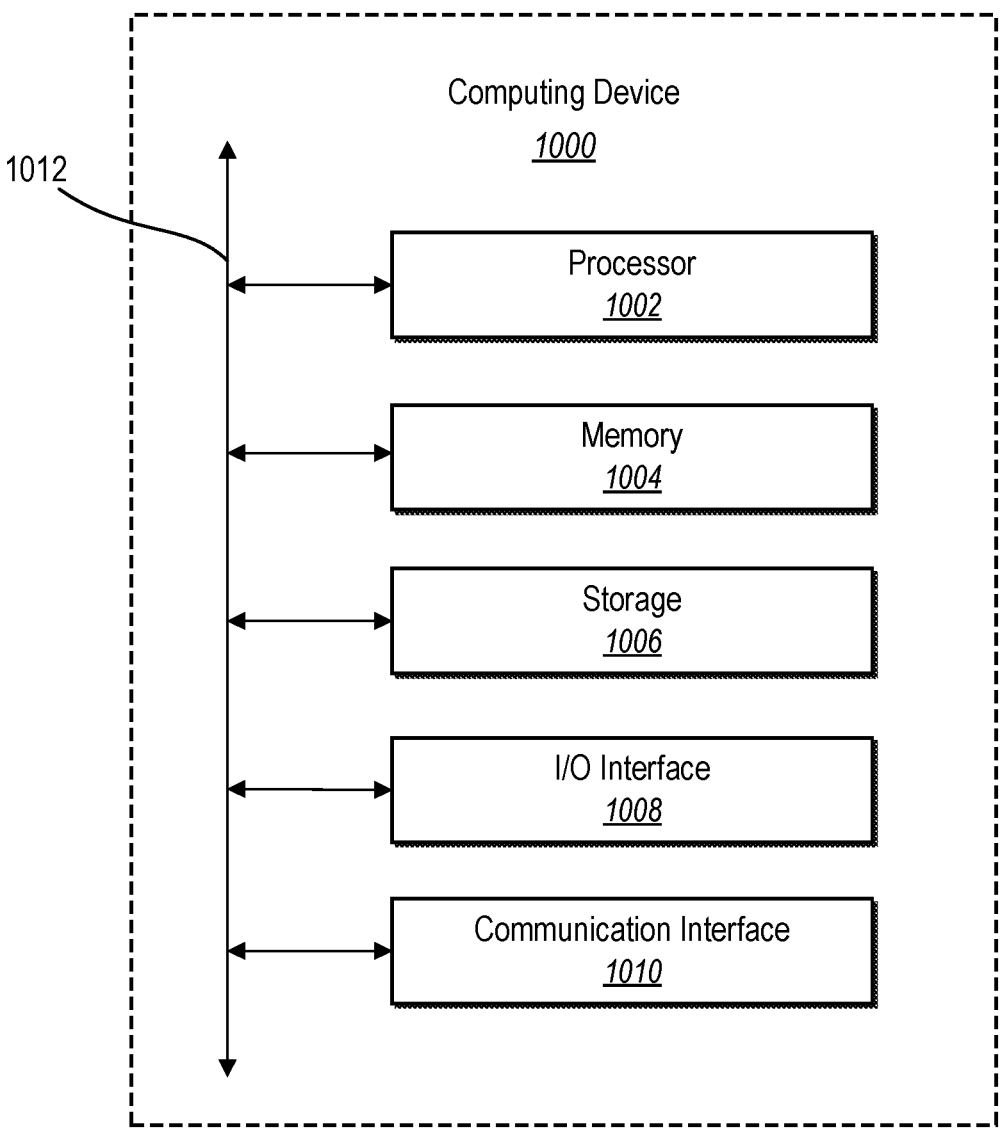
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106 and/or the client device 110). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

constructing a curated dataset to learn parameters for a natural language video localization model by:

generating, utilizing a text embedding model, a set of similarity scores between a target query and a video dataset comprising a plurality of digital videos by:

identifying a set of video captions corresponding with the plurality of digital videos;

generating, utilizing the text embedding model, digital video embeddings for the set of video captions;

generating, utilizing the text embedding model, a target query embedding for the target query; and generating the set of similarity scores by comparing the target query embedding with the digital video embeddings;

determining a false-negative threshold by utilizing the set of similarity scores to identify a subset of false-negative samples;

excluding the subset of false-negative samples from the plurality of digital videos based on the subset of false-negative samples satisfying the false-negative threshold;

determining a negative sample distribution for the plurality of digital videos based on the target query with the subset of false-negative samples excluded, wherein the negative sample distribution is determined based on one or more moments in one or more digital videos of the plurality of digital videos being in a category considered not relevant to the target query; and generating the curated dataset comprising a subset of negative samples based on the negative sample distribution without the subset of false-negative samples; and learning parameters for the natural language video localization model utilizing the curated dataset.

2. The computer-implemented method of claim 1, wherein identifying the set of video captions corresponding with the plurality of digital videos comprises:

identifying a first video caption corresponding to a first frame of a first digital video;

identifying a second video caption corresponding to a second frame of the first digital video;

identifying a third video caption corresponding to a first frame of a second digital video; and generating the digital video embeddings from the first video caption, the second video caption, and the third video caption.

3. The computer-implemented method of claim 1, wherein generating the set of similarity scores comprises:

generating, utilizing a cosine similarity, a similarity score between the target query embedding and a subset of the digital video embeddings for a first video of the plurality of digital videos; and generating, utilizing the cosine similarity, an additional similarity score between the target query embedding and an additional subset of the digital video embeddings for a second video of the plurality of digital videos, wherein the set of similarity scores comprises the similarity score and the additional similarity score.

4. The computer-implemented method of claim 1, further comprises generating a false-negative distribution based on a mean distribution value and standard deviation value of the set of similarity scores.

5. The computer-implemented method of claim 4, further comprises determining the false-negative threshold for the video dataset comprising the plurality of digital videos based on the false-negative distribution by determining a threshold for negative sample candidates, wherein the false-negative threshold comprises a predetermined similarity score above the threshold for negative sample candidates.

6. The computer-implemented method of claim 1, further comprises:

identifying the subset of false-negative samples from the plurality of digital videos based on the subset of false-negative samples satisfying the false-negative threshold;

wherein satisfying the false-negative threshold comprises a similarity score of the subset of false-negative samples being above a predetermined similarity score corresponding with negative sample candidates.

7. The computer-implemented method of claim 1, wherein determining the negative sample distribution further comprises:

determining a mean distribution value and a standard deviation value of the set of similarity scores with the subset of false-negative samples excluded; and identifying the subset of negative samples of the plurality of digital videos from the negative sample distribution.

8. The computer-implemented method of claim 1, wherein generating the curated dataset further comprises constructing the curated dataset by:

extracting positive samples corresponding with the target query from the video dataset to include within the curated dataset;

including the subset of negative samples within the curated dataset; and excluding the subset of false-negative samples from the curated dataset.

9. A system comprising:

one or more memory devices comprising a pre-trained natural language video localization model, wherein the pre-trained natural language video localization model is pre-trained on a curated dataset generated based on a negative sample distribution that is determined from one or more moments in one or more digital videos of a plurality of digital videos being in a category considered not relevant to a target query and a subset of false-negative samples removed; and one or more processors configured to cause the system to:

process a search query from a client device that indicates one or more concepts utilizing the pre-trained natural language video localization model by:

generating, utilizing a text embedding model, a text embedding from the search query received from the client device;

identifying a set of digital video captions from a dataset of digital videos;

generating, utilizing the text embedding model, digital video embeddings for the set of digital video captions from the dataset of digital videos;

generating a set of similarity scores between the target query and the plurality of digital videos by comparing the text embedding from the search query with the digital video embeddings from the dataset of digital videos; and provide, in a graphical user interface, one or more indications of video content from one or more videos responsive to the search query based on the set of similarity scores between the digital video embeddings and the text embedding from the search query, wherein the one or more indications of video content comprises an indicator that points out a specific part of the video content that corresponds to the search query.

10. The system of claim 9, wherein the one or more processors are configured to cause the system to generate the digital video embeddings by utilizing a neural network to generate the set of digital video embeddings from digital video frames of the dataset of digital videos.

11. The system of claim 10, wherein the neural network comprises a Siamese-alike network architecture with late modality fusion.

12. The system of claim 9, wherein the one or more processors are configured to cause the system to:

identify a first video caption corresponding to a first frame of a first digital video;

identify a second video caption corresponding to a second frame of the first digital video;

identify a third video caption corresponding to a first frame of a second digital video; and generate the digital video embeddings from the first video caption, the second video caption, and the third video caption.

13. The system of claim 9, wherein the one or more processors are configured to cause the system to provide one or more indications of video content by identifying a digital video embedding from the digital video embeddings with a similarity score closest to the text embedding from the search query.

14. The system of claim 9, wherein the one or more processors are configured to cause the system to provide one or more indications of video content by causing the client device to display one or more digital videos responsive to the search query, wherein the one or more indications comprise timestamps corresponding to the one or more digital videos responsive to the search query from the client device.

15. The system of claim 9, wherein the one or more processors are configured to cause the system to cause the client device to display one or more digital videos responsive to the search query by ranking the one or more digital videos responsive to the search query according to a corresponding similarity score with the search query.

16. A non-transitory computer-readable medium storing executable instructions which, when executed by a processing device, cause the processing device to perform operations comprising:

generating, utilizing a text embedding model, a set of similarity scores between a target query and a video dataset comprising a plurality of digital videos by:

identifying a set of video captions corresponding with the plurality of digital videos;

generating, utilizing a text embedding model, digital video embeddings for the set of video captions;

generating, utilizing the text embedding model, a target query embedding for the target query; and generating the set of similarity scores by comparing the target query embedding with the digital video embeddings;

determining a false-negative threshold for the plurality of digital videos;

identifying a subset of false-negative samples of the plurality of digital videos to exclude based on the set of similarity scores and the false-negative threshold;

determining a negative sample distribution for the plurality of digital videos based on the target query with the subset of false-negative samples excluded;

identifying a subset of negative samples of the plurality of digital videos based on the negative sample distribution;

generating a curated dataset comprising the identified subset of negative samples without the subset of false-negative samples; and learning parameters of a natural language video localization model based on the curated dataset.

17. The non-transitory computer-readable medium of claim 16, further comprising:

identifying the subset of false-negative samples from the plurality of digital videos based on the subset of false-negative samples satisfying the false-negative threshold as indicated by a similarity score of the subset of false-negative samples being above a predetermined similarity score corresponding with negative sample candidates.

18. The non-transitory computer-readable medium of claim 17, wherein determining the false-negative threshold further comprises generating a false-negative distribution based on the set of similarity scores.

19. The non-transitory computer-readable medium of claim 16, wherein determining the negative sample distribution further comprises determining a mean distribution value and a standard deviation distribution value for the set of similarity scores with the subset of false-negative samples excluded.

20. The non-transitory computer-readable medium of claim 16, further comprises determining probability scores for the plurality of digital videos, wherein the probability scores indicate a likelihood of a digital video of the plurality of digital videos being a negative sample.

\*    \*    \*    \*    \*